April 30, 1935.  E. X. SCHMIDT ET AL  1,999,740
GAS MIXING CONTROL SYSTEM
Filed Aug. 11, 1933  4 Sheets-Sheet 1
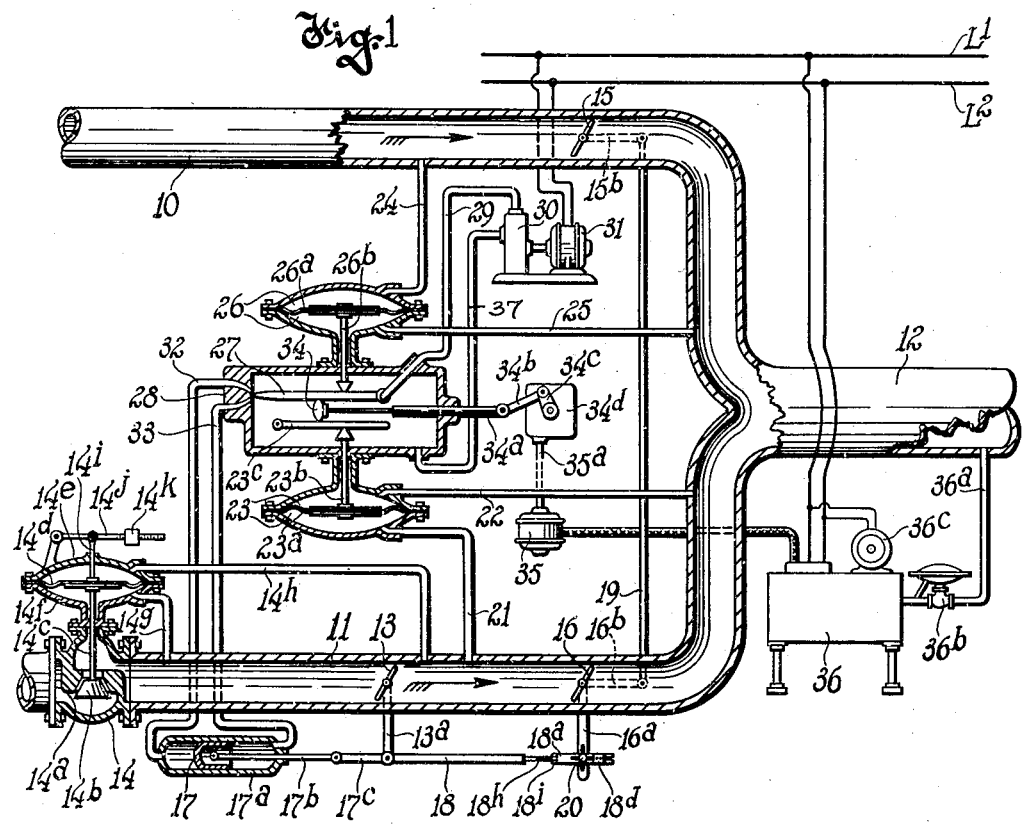
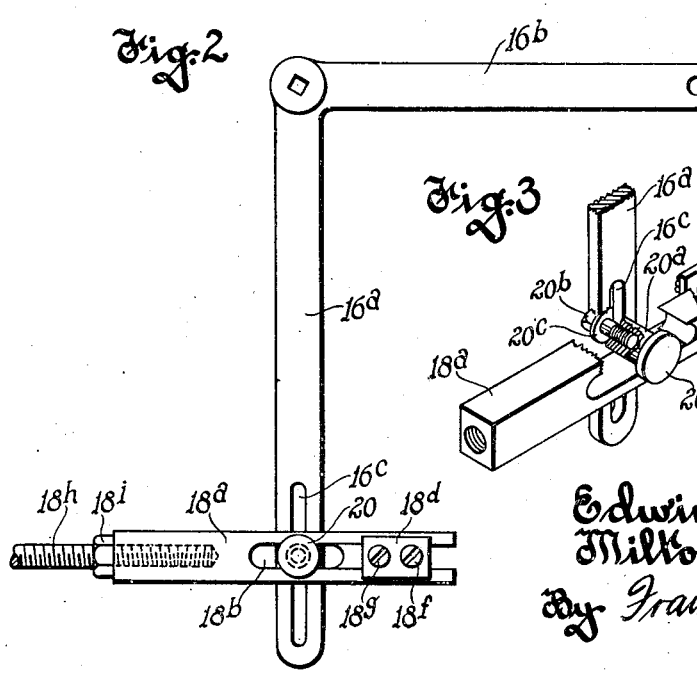
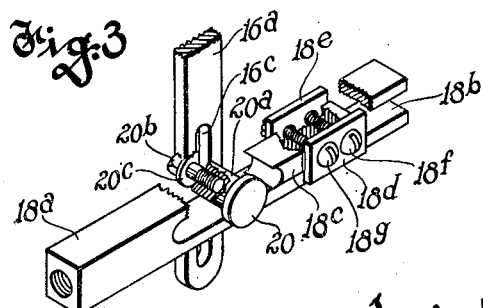
Inventors
Edwin X. Schmidt
Milton R. Brice
By Frank H. Hubbard
Attorney April 30, 1935. E. X. SCHMIDT ET AL 1,999,740
GAS MIXING CONTROL SYSTEM
Filed Aug. 11, 1933 4 Sheets-Sheet 2

Fig. 4

Inventors
Edwin X. Schmidt
Milton R. Brice
By Frank H. Hubbard
Attorney

Patented Apr. 30, 1935

1,999,740

UNITED STATES PATENT OFFICE

1,999,740

GAS MIXING CONTROL SYSTEM

Edwin X. Schmidt, Whitefish Bay, and Milton R. Brice, Milwaukee, Wis., assignors to Cutler-Hammer, Inc., Milwaukee, Wis., a corporation of Delaware Application August 11, 1933, Serial No. 684,634

17 Claims. (Cl. 48—180)

This invention relates to improvements in gas mixing control systems.

An object of the invention is to provide improved means for controlling the proportioning and mixing of a plurality of flows of gaseous fluids of unlike quality whereby a combustible mixture of predetermined total heating value per unit volume is provided.

Another object is to provide means of the aforementioned character including means operable automatically to maintain a predetermined ratio of the pressure drops across adjustable restrictions located in the path of the constituent gaseous fluid flows.

Another object is to provide means of the aforementioned character including a fluid pressure operated valve operable automatically in response to variations in the differential value of said pressure drops, whereby said differential value is normally maintained substantially constant.

Another object is to provide a gaseous fluid mixing and proportioning system wherein the fluid pressure operated valve is normally operable independently of said adjustable restrictions under given conditions and jointly with said restrictions under other conditions.

Another object is to provide means including a calorimeter for automatically and definitely varying the direction and degree of operation of said fluid pressure operated valve independently of the differential value of said pressure drops, whereby the quality or total heating value per unit volume of the gaseous fluid mixture is maintained substantially constant.

Another object is to provide novel means for insuring a predetermined lag between the operation of said fluid pressure operated valve and said restrictions, whereby "hunting" operation of the system as a whole is reduced to a minimum.

Other objects and advantages of the invention will hereinafter appear.

The accompanying drawings illustrate certain embodiments of the invention which will now be described, it being understood that the embodiments illustrated are susceptible of modification in certain details thereof without departing from the scope of the appended claims.

In the drawings, Figure 1 is a diagrammatic and schematic view partly in elevation and partly in section, of a gaseous fluid mixing and proportioning system constructed in accordance with our invention.

Fig. 2 is an enlarged fragmentary view in elevation of certain of the elements illustrated in Fig. 1, and showing the adjustable lost motion linkage.

Fig. 3 is a fragmentary perspective view of certain of the elements shown in Fig. 2, with parts thereof broken away.

Fig. 4 is a schematic and diagrammatic view, partly in elevation and partly in section, of a butane-air mixing control system constructed in accordance with our invention.

Figure 5:
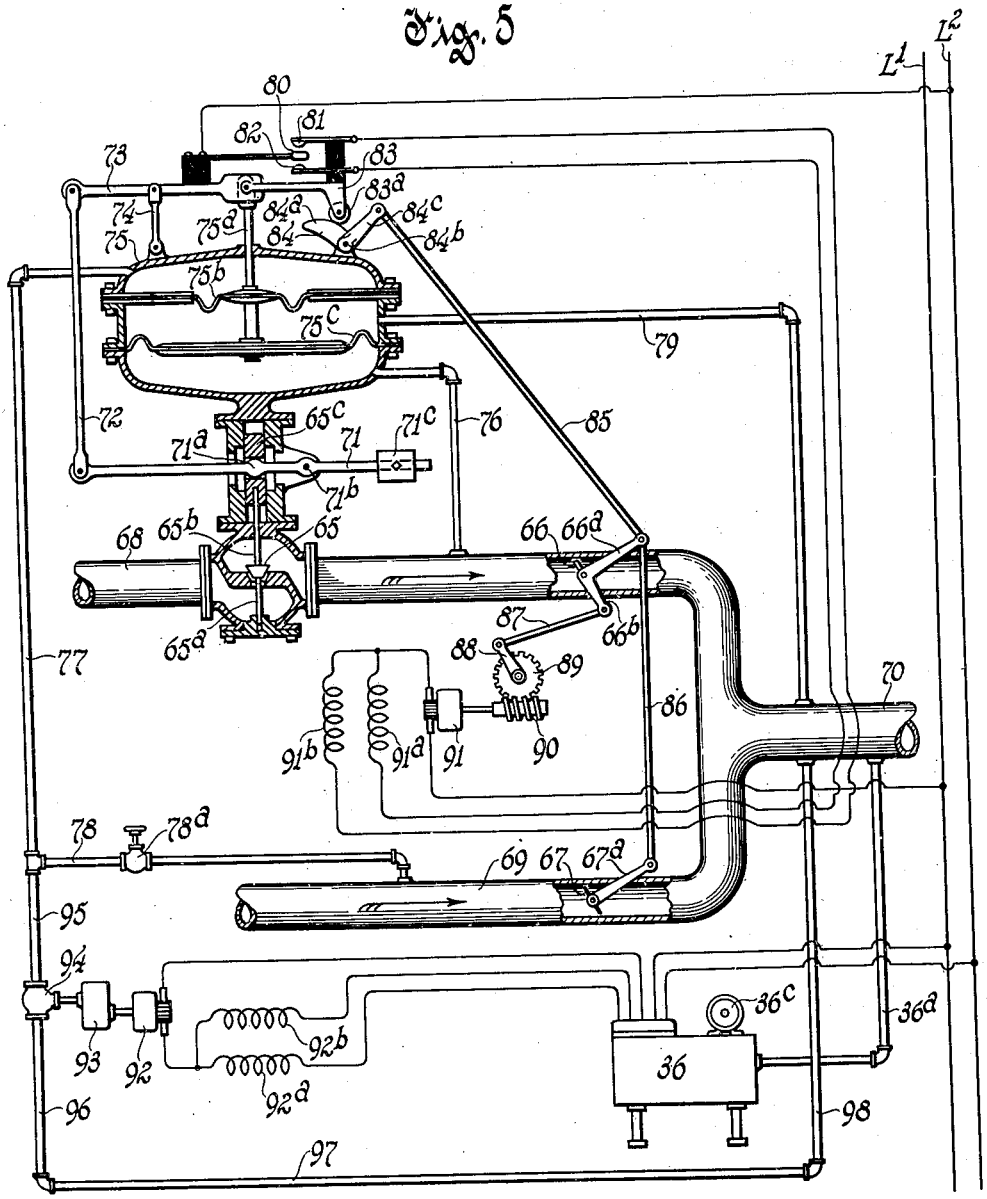
Fig. 5 illustrates schematically and diagrammatically a modified form of gas mixing control system embodying our invention, the view being partly in elevation and partly in section.

Referring first to Fig. 1, the numerals 10 and 11 designate branch conduits through which the constituent gaseous fluids are adapted to flow,—said branch conduits being arranged as shown to discharge into the main conduit 12 to provide for mixture of said constituents; the composite fluid or fluid mixture being supplied from conduit 12 to any desired point or points of consumption or storage. Ordinarily the constituent fluids flowing through branch conduits 10 and 11 will be of different quality or total heating value per unit volume relatively to each other; or, in other words, one constituent flow may consist of a lean gas (such as coke oven gas or even air), in conduit 10, and the other constituent flow may consist of a rich gas, such as natural gas, in conduit 11.

In general neither the flow of rich gas in conduit 11 nor the flow of lean gas in conduit 10 is limited as to its volumetric rate. That is to say, the volumetric rates of flow of the constituent fluids may depend upon or vary in accordance with the rate of demand for the mixture flowing in conduit 12, or upon a variation in the volumetric rate of flow of one fluid relatively to the volumetric rate of flow of the other fluid. In order to provide for attainment of a relatively constant volumetric proportionality of the constituent fluid flows, we have shown in Fig. 1 control of the relative volumetric rate of flow of rich gas through conduit 11. It is to be understood that a similar result would be obtained by controlling the flow of lean gas through conduit 10 instead. A valve 13, in conjunction with a second valve or pressure difference regulator 14, is adapted to regulate or control the relative volumetric proportionality of the fluid flowing in conduit 11. The position of valve 13 is controlled by the ratio of the pressure differences across adjustable restrictions 15 and 16, which are respectively located in the branch conduits 10 and 11. If the pressure drop across the restriction 16 should become smaller than the pressure drop across restriction 15, a piston 17 will be operated, by the means hereinafter described, to effect opening movement of valve 13. The flow of rich gas through conduit 11 will thus be increased until the predetermined or desired ratio of the pressure drops across restrictions 15 and 16 is again established.

A link 18 connects the lever 13ª on valve 13 with the lever 16ª on restriction 16. The lever 16ᵇ on restriction 16 is connected by a link 19 with the lever 15ᵇ on restriction 15, so that angular movements of restrictions 15 and 16 will be equal to each other and in like directions. As best illustrated in Figs. 2 and 3 the length of lever 16ª is adjustable, and means are provided for adjusting the lost motion between a pin 20 and lever 18. Thus pin 20 is provided with a cylindrical portion 20ª the inner end of which is adapted to clampingly engage one face of lever 16ª when drawn thereto by a bolt 20ᵇ having a flange or washer 20ᶜ which similarly engages the other face of lever 16ª,—said portion 20ª having a tapped recess for cooperation with the threaded shank of bolt 20ᵇ,—and lever 16ª having a slot 16ᶜ to permit adjustment of pin 20 with respect thereto.

The portion 18ª of lever 18 is provided with a slot 18ᵇ opening to the outer end thereof,—said slot being of a width to permit clearance between the walls thereof and the cylindrical portion 20ª of pin 20. Adjustable within slot 18ᵇ is a block 18ᶜ, the same having a pair of metal plates 18ᵈ and 18ᵉ arranged on opposite sides thereof, and said block and plates having perforations to accommodate a pair of screws or bolts 18ᶠ, 18ᵍ, whereby said plates may be drawn into clamping engagement with said lever portion 18ᵇ to retain block 18ᶜ in any desired position. The portion 18ª is adjustably connected with the main body of lever 18 as by means of the threaded element 18ʰ which may be retained in any adjusted position thereof as by means of a nut 18ⁱ. Thus by adjusting element 18ʰ to bring the left-hand end of slot 18ᵇ into engagement with the cylindrical portion 20ª of pin 20 and by moving the block 18ᶜ toward the left into engagement with said cylindrical portion 20ª, all lost motion between valve 13 and restrictions 16 and 15 will be eliminated so that the same will move in unison. Under these conditions it is to be understood that restrictions 15 and 16 may be arranged in angular positions corresponding with the angular position of valve 13 or differing therefrom if desired.

By moving the pin 20 up or down within slot 16ᶜ in lever 16ª from the intermediate position thereof illustrated the degree of angular movement of restrictions 15 and 16 upon a given angular movement of valve 13 may be varied at will. This arrangement also permits selection of any desired value of the pressure drops across the respective restrictions 15 and 16 for any given angular position of valve 13.

The aforedescribed lost motion connection between valve 13 and restrictions 15 and 16 assists in stabilizing the fluid flow control. Assume that the adjustment of the parts is such that this lost motion is equivalent to ten degrees angular travel or movement of valve 13. Under this condition restrictions 15 and 16 will act as fixed orifices regardless of the movement of valve 13 in either direction through an angle of five degrees from the position thereof corresponding to midposition of the lost motion. In normal operation this feature is of great importance since in general valve 13 will almost continually move back and forth slightly to correct for slight changes in the rate of flow of fluid through conduit 10 and to compensate for operating irregularities of pressure difference regulator 14 and other accessory equipment. Due to the provision of the aforedescribed lost motion the restrictions 15 and 16 will be permitted to remain stationary notwithstanding such minor variations in the angular position of valve 13.

If the fluid flows through restrictions 15 and 16 should increase to the point where the pressure drops across these restrictions become excessively high the angular position of valve 13 will be changed sufficiently to take up the lost motion in the coupling (see Fig. 2) thus effecting movement of restrictions 15 and 16 jointly with valve 13 to increase their area and decrease their pressure drops to the normal values. A similar correction is effected if the pressure drop across restrictions 15 and 16 becomes too low to give satisfactory sensitivity of pressure ratio control.

The pressure difference regulating valve 14 associated with valve 13 may be of any well known form, and as shown the same comprises essentially a partition 14ª having an opening providing a valve seat of frusto-conical form, a valve member 14ᵇ movable into and out of engagement with said seat, a rod 14ᶜ for supporting said valve member, said rod being attached to a flexible diaphragm 14ᵈ which is carried within and divides a closed chamber formed by the metal members 14ᵉ and 14ᶠ. A small pipe 14ᵍ affords communication between said chamber beneath said diaphragm 14ᵈ and the conduit 11 at the upstream side of valve 13. A similar pipe 14ʰ affords communication between said chamber above diaphragm 14ᵈ and conduit 11 at the downstream side of valve 13. Valve 14 is provided with the usual loading means, as represented by the rod 14ⁱ attached to diaphragm 14ᵈ and to the pivoted lever 14ʲ carrying an adjustable weight 14ᵏ. By this means the valve member 14ᵇ is operable automatically under all conditions to vary the rate of flow of fluid through conduit 11 whereby a substantially constant predetermined pressure drop is maintained across valve 13.

The means for controlling the operation of valve 13 is in general similar to that disclosed in the Wunsch Patent No. 1,558,529, dated October 27, 1925, but differs therefrom primarily in the employment of adjustable restrictions 15 and 16 instead of the fixed orifices disclosed in said patent. Thus we have shown a pair of pipes 21 and 22 respectively affording communication between conduit 11 on the upstream and downstream sides of adjustable restriction 16 and a closed chamber 23 below and above a diaphragm 23ª located within the latter. Diaphragm 23ª carries a push-rod 23ᵇ which engages a pivoted lever 23ᶜ. In like manner a pair of pipes 24 and 25 are arranged respectively to afford communication between conduit 10 on the upstream and downstream sides of adjustable restriction 15 and a closed chamber 26 above and below a diaphragm 26ª located within the latter. Diaphragm 26ª carries a push-rod 26ᵇ which engages a pivoted jet-pipe 27.

As shown certain of the parts including jet-pipe 27 are located within a fluid-tight chamber 28, and said jet-pipe is supplied through pipe 29 with fluid from a pump or compressor 30 which is adapted to be continuously driven as by means of an electric motor 31. The jet-pipe 27 is adapted under given conditions to be centered with respect to the adjacent ends of a pair of pipes 32 and 33, which ends are exposed within said chamber 28. The opposite ends of pipes 32 and 33 communicate respectively with opposite ends of a cylinder 17a within which the aforementioned piston 17 is slidable. Piston 17 carries a rod 17b which is pivotally connected with a link 17c,—the latter being pivotally connected with lever 13a.

Interposed between and engaging jet-pipe 27 and lever 23c is a slide or knob 34 which is adjustable to provide for variations of the ratio of the pressure drops across the restrictions 15 and 16. Slide 34 is carried by a rod 34a which is slidably supported within a bearing in the end wall of chamber 28. Rod 34a is connected by linkage 34b, 34c with suitable speed-reducing gearing 34d,—the latter being connected, through drive shaft 35a, with a reversible electric motor 35. Motor 35 is subjected to control in a well known manner by a calorimeter 36 which is adapted to withdraw and burn a continuous sample of the fluid mixture flowing in conduit 12. The continuous sample is withdrawn from conduit 12 through pipe 36a,—a suitable pressure regulating device 36b being provided. We prefer to employ a calorimeter of the precision type, as, for example, that disclosed in the Packard Patent No. 1,625,277, dated April 19, 1927, to which reference may be had for a detailed description of the operation of the calorimeter. It will be understood that upon an increase or decrease in the total heating value per unit volume of the fluid mixture with respect to a predetermined value the motor 35 will be operated in one direction or the other to adjust slide 34 whereby the required variation in the ratio of the pressure drops across restrictions 15 and 16 is effected.

The fluid flowing through jet-pipe 27 preferably comprises a body of liquid, such as oil, entrained within the cylinder 17a, piping 32, 33, chamber 28, piping 29, 37 and compressor 30, thus affording a continuous circulation of that portion of the liquid which is not contained within the piping 32, 33 and cylinder 17a. Lines L¹ and L² as shown may constitute a common source of energy supply for the motors 31 and 35 and the motor 36c associated with the calorimeter 36.

The advantages of the system aforedescribed will be apparent to those skilled in the art. The control elements operate in a simple and efficient manner to compensate for variations in the relative rates of flow of the constituent fluids as an incident to variations in the rate of demand for the mixture or to variations in the supply pressures of said constituent fluids individually, whereas the calorimetric means aforedescribed operates to definitely proportion the constituent fluids to compensate for variations in the total heating value per unit volume of the mixture. Due to the fact that our arrangement of control elements tends to reduce to a minimum the "hunting" effect of the system as a whole it will be apparent that the total heating value per unit volume of the mixture is maintained more nearly constant than was possible with gas mixing control devices of the prior art. For the same reason the degree of wear upon the various flow controlling elements is reduced to a minimum, with a consequent reduction in the amount of electrical energy required for normal operation of the system. As will be understood the calorimeter 36 may include a recording mechanism of the character disclosed in said Patent No. 1,625,277.

In Fig. 4 we have shown the control system of Fig. 1 combined with various other elements to provide for mixing flows of butane gas and air. The corresponding parts in Figs. 1 and 4 have been given like characters of reference to facilitate understanding of the latter figure. Thus in Fig. 4 the numeral 38 designates a fragment of a tank or container which is adapted to be partially filled with a body of butane liquid. As is well understood said liquid is vaporable automatically except under extremely low temperature conditions,—the butane vapor being adapted to pass under its own pressure through a conduit 39 and valve 40. Valve 40 is of the well known diaphragm type, wherein the lower surface of the diaphragm 40a is subjected, through pipe 40b to pressure conditions on the downstream side thereof,—the upper surface of said diaphragm being subjected to the pressure of an adjustable weight 40c, whereby the pressure on the downstream side of valve 40 is maintained at a predetermined substantially constant value.

Located within conduit 11 between valve 40 and the pressure difference regulating valve 14 is a valve 41 which is normally biased to closed position as by means of a compression spring 41a, said valve including a diaphragm 41b the upper surface of which may be subjected to the pressure of a fluid, through piping 41c, 41d, from a suitable source indicated by pipe 41e. Interposed between pipes 41c and 41d is a valve 41f which normally interrupts communication therebetween,—said valve in its normal position being adapted to provide for communication of pipe 41d with an exhaust pipe 41g to relieve the pressure on diaphragm 41b whereby valve 41 is permitted to close. Valve 41f is provided with a solenoid winding 41h which when energized is adapted to open communication between pipes 41c and 41d and interrupt communication between the latter and pipe 41g. The energizing circuit of winding 41h is adapted to be completed upon energization and closure of any one of a plurality of electro-magnetically operable switches 42, 43 and 44, as hereinafter more fully described.

The diaphragm valve 14 functions in the manner described in connection with Fig. 1 to insure a predetermined value of the pressure drop across the flow controlling valve 13. Valve 13 is operable automatically in the manner aforedescribed to insure maintenance of a predetermined ratio of the pressure drops across the adjustable restrictions 16 and 15 in conduits 11 and 10, respectively,—said ratio being varied by motor 35 under control of calorimeter 36 whereby the total heating value per unit volume of the mixture of butane gas and air flowing in conduit 45 is maintained substantially constant.

As aforedescribed the restrictions 15 and 16 are connected by lever 15b, link 19 and lever 16b for operation in unison,—said restriction 16 being connected with valve 13 for operation jointly with the latter under given conditions and for operation of valve 13 individually under other conditions. The air conduit 10 preferably has its intake open to atmosphere,—a normally closed valve 46, like that shown at 41, being provided—the diaphragm of said valve being subjected to pressure of the aforementioned fluid, through piping 41ᵈ and 41ᵉ, under given conditions to effect opening thereof simultaneously with valve 41.

The fluid mixture in conduit 45 may be drawn through any one or more of the branch conduits 47, 48 and 49 upon operation of the respective compressors or pumps 47ᵃ, 48ᵃ and 49ᵃ, which are respectively provided with individual electric driving motors 47ᵇ, 48ᵇ and 49ᵇ. A well known form of driving connection between each motor and its associated compressor is illustrated,—it being understood that any other suitable form of driving connection may be employed. Motors 47ᵇ, 48ᵇ and 49ᵇ are respectively subjected to control by the aforementioned switches 42, 43 and 44. In the diagrammatic illustration the several compressors and motors are shown of like size. In practice, however, the compressor 47ᵃ would be comparatively small, with a capacity of, say, ten per cent of the maximum output of the plant. It would, through conduits 47 and 50, supply the mixture directly to the distributing conduit 51 at a low pressure,—starting and stopping under the control of a pressure operated switch 47ᶜ set to close an energizing circuit when the pressure in conduit 51 drops below, say, four an one-half pounds per square inch and to close a shorting circuit when said pressure exceeds, say, five pounds per square inch.

The compressor 48ᵃ would be relatively larger, capable of delivering, say, sixty per cent of the maximum output. Its associated pressure operated switch 48ᶜ would be set, say, to close an energizing circuit when the pressure in conduit 51 drops below four and one-quarter pounds per square inch and to close a shorting circuit when said pressure exceeds four and three-quarters pounds per square inch, so that it would only operate when compressor 47ᵃ could not supply enough gas to meet the demand. As aforeindicated compressor 48ᵃ would also supply the gas to conduit 51 at a relatively low pressure.

The compressor 49ᵃ would be relatively smaller than compressor 48ᵃ and would be capable of delivering about twenty per cent of the maximum output, the same being adapted to discharge into the high pressure storage holder 52. Compressor 49ᵃ would be started and stopped by a pressure switch 49ᶜ, the latter being set to initiate operation of said compressor when the pressure in holder 52 falls below fifty pounds per square inch and to interrupt said operation when the pressure in said holder exceeds seventy-five pounds per square inch. Thus a supply of the gaseous mixture would always be available in holder 52 to help handle the peak load of the plant, and to serve in the event that mixing was interrupted due to failure of the electric power supply or due to repairs to any of the other elements of the plant equipment. The pressure regulating valve 53 at the outlet of the storage holder 52 might be set to open only when the pressure in conduit 51 falls below four pounds per square inch, so that gas from the holder would be used only during the time of peak demand when compressors 47ᵃ and 48ᵃ were not able to handle the load.

In practice the control equipment would preferably be arranged to interlock the pressure switches 47ᶜ, 48ᶜ, 49ᶜ, compressor motors 47ᵇ, 48ᵇ, 49ᵇ, starting switches 42, 43, 44, shut-off valves 41, 46, 41ᶠ and supervision by calorimeter 36 to insure completely automatic operation of the plant. An alarm would ring in the event of high or low total heating value per unit volume of the mixture, or upon voltage failure, or upon failure or extinguishment of the calorimeter flame. A pressure switch would be installed in the butane vapor line to shut down the mixing equipment and ring an alarm in the event of failure of the pressure in said line. After a power failure, mixing would be resumed without calorimeter flame was relighted. Certain of the features aforementioned are commonly provided in butane-air mixing plants of the general character herein disclosed, or the manner of providing such features will be apparent to those skilled in this art, and hence detailed description thereof is deemed unnecessary herein. However, it will be noted that we have shown at 54 a switch which is normally biased to closed position and adapted to be held open under normal pressure conditions in the butane line 11. Upon failure of said pressure switch 54 will close to complete an energizing circuit for the bell ringer 54ᵃ or other signal device.

We have shown associated with the butane tank 38 a well known form of vaporizer 38ᵃ of the hot water type,—said vaporizer being employed under relatively low temperature conditions to insure a proper supply of butane vapor,—pipes 38ᵇ and 38ᶜ being employed to provide communication between the vaporizer and tank 38 and between the vaporizer and conduit 39.

In the event that compressors 47ᵃ and 48ᵃ are idle while the compressor 49ᵃ is being operated to bring the mixture in holder 52 to the desired maximum pressure, it will be noted that the normally closed contacts 42ᵃ and 43ᵃ of switches 42 and 43 will be closed and the normally open contacts 44ᵃ of switch 44 will be closed, thus completing an energizing circuit for the operating winding 55ᵃ of a valve 55. Energization of said winding results in interruption of communication between pipe 36ᵃ and the calorimeter while affording communication between pipe 36ᵉ and said calorimeter. In this manner the quality or total heating value per unit volume of the mixture supplied to holder 52 is ascertained and controlled to maintain the same substantially constant. When either or both of the compressors 47ᵃ and 48ᵃ are in operation, however, the test sample for the calorimeter is withdrawn or taken from the main or conduit 51, due to normal positioning of valve 55.

It will be noted that when compressor 49ᵃ is running at the same time as either or both of the compressors 47ᵃ and 48ᵃ, the gas mixture going into the holder 52 through conduit 49 will be of the same quality or total heating value per unit volume as that going to the calorimeter through conduit 50 and pipe 36ᵃ, since all of the gas mixture flowing to the three compressors is taken from conduit 45.

The use of three compressors of the character hereinabove described has certain obvious advantages. In the first place, most of the gas is pumped to a relatively low pressure, thus effecting a very substantial saving in power cost. For example, if compressor 47ᵃ has a rated capacity of two thousand cubic feet per hour; 48ᵃ ten thousand cubic feet per hour, and 49ᵃ two thousand cubic feet per hour,—compressor 47ᵃ would require a motor 47ᵇ of about one-half horse-power; 48ᵃ would require a motor of about four horse-power, and 49ᵃ would require a motor of about seven and one-half horse-power. Most of the gas would be delivered by compressors 47ᵃ and 48ᵃ. Compared with this, if a single fifteen thousand cubic feet per hour compressor were installed to pump all of the gas up to seventy-five pounds pressure per square inch, it would require about a forty horse-power motor, and the plant would use about two and one-half times as much electric energy for the same delivery of gas. Moreover, the cost of two low pressure compressors with one small high pressure compressor will be substantially the same as the cost of one large high pressure compressor. The small motors employed as herein described would give a much better load factor and a more favorable electric power rate than one large motor which would be required to start and stop quite frequently. Another advantage is that both the low pressure and high pressure compressors are adapted for utilization automatically to meet a relatively high or peak demand for the gaseous mixture.

Any one or two of the compressors herein disclosed may be shut down for fairly long periods of time without interfering with the operation of the rest of the equipment. The proportioning equipment will handle the mixing alone fairly well during any time that repair work must be done on the calorimeter. The pressure storage holder 52 can supply gas to carry over power failure or the time required to make any ordinary repairs on the proportioning equipment.

Where a gas plant must start out with only a few customers and build up its load gradually it would be possible to design the plant for three or even four compressors and then install the compressors one at a time. The high pressure compressor 49$^a$ would be installed first, then later compressor 47$^a$, and still later compressor 48$^a$. The original control would be designed in the manner herein disclosed to handle the ultimate or complete equipment.

The operation will be described with the assumption that the gas in holder 52 has been brought to the desired maximum pressure of seventy-five pounds per square inch, or is at least above the minimum pressure of fifty pounds per square inch. It will be further assumed that the pressure in main or conduit 51 has dropped below four and one-half pounds per square inch, with consequent movement of the contactor of switch 47$^c$ to the left, as illustrated, to complete an energizing circuit for the winding 42$^b$ of switch 42. Said circuit may be traced from the line L$^1$ by conductor 56 through a suitable current limiting resistance 57, through said winding 42$^b$ by conductor 58 through the left-hand contact and the contactor of switch 47$^c$, and by conductor 59 to line L$^2$. The main contacts 42$^c$, 42$^d$ of switch 42 when closed complete an energizing circuit for the motor 47$^b$ as will be obvious. The auxiliary contacts 42$^e$ when closed provide a maintaining circuit for winding 42$^b$, shunting the contacts of pressure switch 47$^c$. The auxiliary contacts 42$^f$ when closed as shown complete an energizing circuit for the operating winding 41$^h$ of valve 41$^f$, said circuit extending from line L$^1$ by conductor 60 through said winding 41$^h$, conductor 61 through said contacts 42$^f$ and by conductors 62 and 63 to line L$^2$. Valve 41$^f$ is thus operated to subject the diaphragms of valves 41 and 46 to pressure from the source of fluid supply represented by pipe 41$^e$, whereupon valves 41 and 46 are opened to permit passage of the butane vapor and air. Such vapor and air are proportioned and mixed in the manner described in detail in Fig. 1,—the mixture thereof being supplied by compressor 47$^a$ to conduit 51, from which a sample is withdrawn, through pipe 36$^a$, by calorimeter 36.

Compressor 47$^a$ will remain in operation pending a rise in pressure of the fluid in conduit 51 above five pounds per square inch, whereupon the contactor of switch 47$^c$ will be moved into engagement with the right-hand contact to provide a circuit shorting the winding 42$^b$ of switch 42. Said short circuit may be traced from line L$^1$ by conductor 56 through resistance 57, conductor 64 through said right-hand contact and the contactor of switch 47$^c$, by conductor 58 through contacts 42$^e$ and by conductors 62 and 63 to line L$^2$. If, however, the quantity of fluid supplied by compressor 47$^a$ is insufficient to meet the demand through conduit 51, the pressure in the latter will drop still lower, and when said pressure drops below, say, four and one-quarter pounds per square inch the contactor of switch 48$^c$ will move automatically into engagement with the left-hand contact to complete an energizing circuit for the winding 43$^b$ of switch 43, said circuit being obvious from the foregoing description of switch 42. Closure of main contacts 43$^c$, 43$^d$ completes the circuit of motor 48$^b$; auxiliary contacts 43$^e$ act to maintain the energizing circuit of winding 43$^b$, and auxiliary contacts 43$^f$ serve to complete an additional or alternative energizing circuit for the winding 41$^h$ of valve 41$^f$.

Compressor 48$^a$ will remain in operation, along with compressor 47$^a$, pending a rise in pressure of the fluid above four and three-quarters pounds per square inch, whereupon the contactor of switch 48$^c$ will have been moved automatically into engagement with the right-hand contact to complete a circuit shorting the winding 43$^b$ to permit opening of switch 43 with consequent stopping of motor 48$^b$ and the compressor 48$^a$ driven thereby.

If the quantity of the mixture supplied by compressors 47$^a$ and 48$^a$ is not sufficient to meet the demand the pressure of fluid in conduit 51 will fall still lower, and when said pressure drops to, say, four pounds per square inch valve 53 will be opened automatically to permit a flow of the mixture from holder 52. When the quantity of the mixture discharged from holder 52 has reduced the pressure in the latter to fifty pounds per square inch the contactor of switch 49$^c$ will have been moved automatically into engagement with the left-hand contact, thus completing an energizing circuit for motor 49$^b$ to effect operation of compressor 49$^a$. The contacts 44$^e$ provide a maintaining circuit for the winding 44$^b$; the contacts 44$^f$ provide an additional or alternative energizing circuit for the winding 41$^h$ of valve 41$^f$; whereas contacts 44$^a$ will act to provide an energizing circuit for the winding 55$^a$ of valve 55 only in the event that the auxiliary contacts 42$^a$, 43$^a$ of switches 42 and 43 are simultaneously in their normally closed positions. If the rate of discharge of the mixture from holder 52 is or becomes less than the rate of supply thereto by compressor 49$^a$, the pressure in said holder will gradually increase until the maximum pressure of seventy-five pounds per square inch is attained, whereupon the contactor of switch 49$^c$ will have been moved automatically into engagement with the right-hand contact, thereby short-circuiting the winding 44$^b$ of switch 44 to interrupt the operation of motor 49$^b$.

The gas mixing and proportioning system illustrated in Fig. 5 is functionally similar to that shown in Fig. 1, inasmuch as means are provided to afford a predetermined degree of movement of the flow controlling valve 65 in either direction independently of the adjustable restrictions 66 and 67. Any movement of valve 65 beyond said range (which is determined by the particular angular positions of restrictions 66 and 67) will result in joint movement of valve 65 and restrictions 66 and 67 toward full open or full closed position. Valve 65 and restriction 66 are located within a branch conduit 68, through which, it may be assumed, the rich gas constituent is adapted to flow; and restriction 67 is located within a branch conduit 69 through which the relatively lean gas or air is adapted to flow,—said branch conduits 68 and 69 discharging into the main conduit 70 for mixing of the constituents and for conducting the mixture to a point or points of storage or consumption. The valve 65 is of a special form and comprises a stem the lower portion 65$^a$ of which is slidable within a recess in the valve chamber to center the same with respect to the valve opening, and the upper end 65$^b$ of which is attached to and movable with a block 65$^c$ which is slidable within the valve casing. Block 65$^c$ is provided with an opening to receive the enlarged or rounded portion 71$^a$ of a lever 71 which is pivoted at 71$^b$ and biased by an adjustable weight 71$^c$ to approximately balance the weight of all moving parts. However, the left-hand end of lever 71 is connected by link 72 with the corresponding end of a lever 73 which is pivotally supported at the upper end of a link 74 the lower end of which is pivoted to the diaphragm-supporting casing 75. The right-hand end of lever 73 is pivotally connected with the upper end of a rod 75$^a$ which is rigidly attached to a pair of spaced diaphragms 75$^b$, 75$^c$ located within the casing 75. As will be noted, the diaphragm 75$^b$ is shown as having a much smaller effective area than the diaphragm 75$^c$,—the relative size of said diaphragm being predetermined in accordance with the control characteristics desired from the valve 65. In other words, the areas of said diaphragms will be selected in accordance with the ratio desired between the pressure drops across restrictions 66 and 67.

In the arrangement illustrated the lower face of diaphragm 75$^c$ is subjected by piping 76 to the pressure of fluid at the upstream side of restriction 66; the upper face of diaphragm 75$^b$ is subjected by piping 77, 78 to the pressure of fluid at the upstream side of restriction 67; and the adjacent faces of said diaphragms are jointly subjected by piping 79 to the common pressure of fluid at the downstream side of each restriction 66 and 67. Located within pipe 78 is a valve 78$^a$ to provide for initially manually adjusting the ratio of the pressure drops across restrictions 66 and 67. Assuming an initial adjustment of the aforedescribed parts to provide a predetermined ratio of the volumetric rates of flow of the constituent fluids within branch conduits 68 and 69 it is to be understood that the valve 65 will be moved automatically toward an open or closed position through the medium of diaphragms 75$^b$, 75$^c$ to maintain substantially constant the predetermined ratio of the pressure drops across restrictions 66 and 67. Therefore the volumetric proportionality of the constituent fluid flows will be maintained substantially constant notwithstanding variations in the rates of flow thereof jointly as an incident to variations in demand for the mixture. Thus the valve 65 may be moved either up or down through a given range independently of the restrictions 66 and 67 to accurately and positively control the volumetric proportionality of the fluid constituents. Moreover, it will be noted that movement of valve 65 in one direction or the other beyond a predetermined range is necessary to effect the desired movements of said restrictions.

In the event of a relatively wide variation in the differential value of the pressure drops across restrictions 66 and 67 (as an incident to a relatively large increase or decrease in the demand for the fluid mixture), the resulting relatively large degree of movement of valve 65 will cause the contactor 80 carried by lever 73 to engage one or the other of the pair of spaced contacts 81, 82. Contacts 81 and 82 are carried by but insulated from a member 83 which is pivotally attached to the upper end of rod 75$^a$. Member 83 carries at its outer end a roller 83$^a$ which rests upon the curved edge 84$^a$ of a cam member 84,—the latter being pivotally supported at 84$^b$ by casing 75 and having an integral lever arm 84$^c$. Arm 84$^c$ is connected by link 85 with one arm 66$^a$ of the actuating lever associated with restriction 66. A link 86 is pivotally connected with arm 66$^a$ and with the lever arm 67$^a$ of restriction 67 to provide for movement of said restrictions in unison.

The arm 66$^b$ is pivotally connected with one end of a link 87, the other end of said link being pivotally connected with the lever 88 attached to and movable with a pinion 89. Motor 91 is preferably of the split-field reversible type; the field 91$^a$ being energized to provide for operation of motor 91 in one direction upon engagement of contactor 80 with contact 82, and the field 91$^b$ being energized to provide for operation of motor 91 in the reverse direction upon engagement of contactor 80 with contact 81. As will be apparent the operation of motor 91 will effect an adjustment of restrictions 66 and 67 jointly,— the cam 84 and linkage 84$^c$, 85 providing for simultaneous adjustment of the position of contacts 81 and 82. Such adjustment of contacts 81 and 82 will tend to effect separation of the active contact from the contactor 80,—the degree of angular movement of restrictions 66 and 67 necessary to effect such separation being of course dependent upon the degree to which valve 65 has been moved outside of the range previously preselected therefor.

A calorimeter 36 of the character aforementioned is preferably employed,—the same being supplied, through piping 36$^a$, with a continuous sample of the mixture from conduit 70. Any well known means may of course be provided for regulating the pressure of the sample of fluid supplied to the calorimeter. The calorimeter is provided with elements (not shown) which are operable in response to variations in the total heating value per unit volume of the fluid mixture to effect energization of one or the other of the fields 92$^a$ or 92$^b$ of the split-field reversible motor 92. Motor 92 is connected, through suitable reducing gearing 93, to a valve 94 which is adapted when so adjusted to bleed or by-pass more or less of the fluid flowing through pipe 78, whereby the pressure of fluid on the upper face of diaphragm 75$^b$ is varied. The fluid so vented is carried through piping 95, 96, 97 and 98 and discharged into conduit 70.

Figure 6:
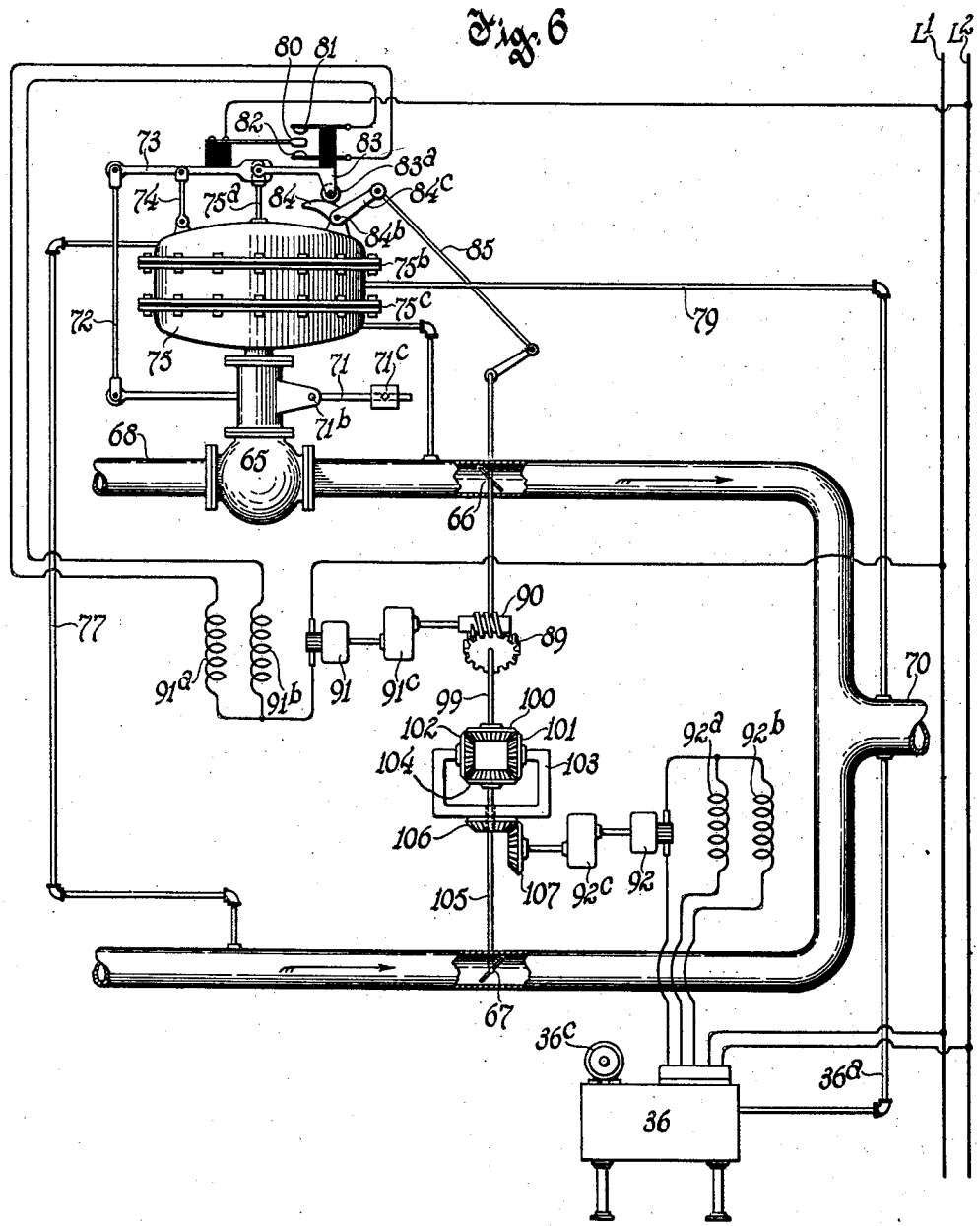
Fig. 6 illustrates schematically and diagrammatically in elevation a further modified form of gas mixing control system embodying our invention, certain of the parts being broken away.

The fluid mixing control system illustrated in Fig. 6 is substantially like that shown in Fig. 5 and corresponding parts have been given like characters of reference. In Fig. 6, however, the motor 91 is adapted to drive the worm gear 90 through suitable reducing gearing 91$^c$, and the pinion 89 is keyed or otherwise rigidly secured to a shaft 99 which directly drives the restriction

66. The lower end of shaft 99 has fixed thereto a bevel gear 100 which meshes with a pair of bevel gears 101, 102 which are rotatably carried on the stub-shaft ends of a substantially rectangular frame member 103. The gears 101, 102 in turn mesh with a bevel gear 104 secured to one end of shaft 105,—the other end of said shaft carrying the adjustable restriction 67. Secured to frame 103 in a plane parallel to the plane of support of gear 104 is a bevel gear 106,—the frame 103 and gear 106 having alined openings to provide clearance for shaft 105. Meshing with gear 106 is a bevel gear 107 which is adapted to be driven (through suitable reducing gearing 92c) by the motor 92. As will be apparent, during inaction of motor 92 the gears 107, 106 and frame 103 will be locked against movement, and hence any rotary movement of shaft 99 will be transmitted, through the gears 100, 101, 102 and 104, to shaft 105 (it being understood that the restrictions 66 and 67 are under these conditions moved to like degrees in opposite directions respectively).

Moreover, in the event of any variation in the quality or total heating value per unit volume of the fluid mixture (as determined by calorimeter 36) the motor 92 will be operated in one direction or the other to effect the required adjustment of restriction 67 independently of the restriction 66. Thus upon operation of motor 92 the gear 107 drives gear 106 with its attached frame 103, and due to the fact that gear 100 is locked against movement pending movement of worm 90 and pinion 89 by motor 91, the gears 101 and 102 will ride over gear 100 while effecting the usual differential movement of gear 104, shaft 105 and restriction 67. The operation of the device illustrated in Fig. 6 is in all respects essentially like the operation described in connection with Fig. 5,—it being apparent that any movement of restriction 67 individually will effect a variation in the pressure on the upper face of the diaphragm 75b substantially corresponding to the variation in such pressure afforded by adjustment of the valve 94 in Fig. 5.

What we claim as new and desire to secure by Letters Patent is:

1. In a gas mixing control system, in combination, a pair of branch conduits through which gaseous fluids are respectively adapted to flow, a main conduit into which said branch conduits are adapted to discharge to provide for mixing of said fluids, an adjustable restriction in each of said branch conduits, a flow controlling valve in one of said branch conduits, means including diaphragms respectively operable automatically in response to variations in the values of the pressure drops across said restrictions, means controlled by said diaphragms jointly for effecting operation of said flow controlling valve whereby said pressure drops are normally maintained substantially proportional to each other, means including a calorimeter for withdrawing from said main conduit and burning a continuous sample of the fluid mixture to ascertain the total heating value per unit volume thereof, means controlled by said calorimeter for modifying the operation of said flow controlling valve, whereby the proportionality of said fluid flows is definitely varied in accordance with and to compensate for variations in the total heating value per unit volume of said mixture with respect to a predetermined value, said flow controlling valve being operable throughout a predetermined and pre-adjustable range independently of said restrictions under given pressure conditions, and means coacting with said flow controlling valve to insure operation of said restrictions jointly therewith upon operation thereof in either direction beyond said range.

2. In a gas mixing control system, in combination, a pair of branch conduits through which gaseous fluids are respectively adapted to flow, a main conduit into which said branch conduits are adapted to discharge to provide for mixing of said fluids, an adjustable restriction in each of said branch conduits, a flow controlling valve in one of said branch conduits, means including diaphragms respectively operable automatically in response to variations in the values of the pressure drops across said restrictions, means controlled by said diaphragms jointly for effecting operation of said flow controlling valve whereby said pressure drops are normally maintained substantially proportional to each other, means including a calorimeter for withdrawing from said main conduit and burning a continuous sample of the fluid mixture to ascertain the total heating value per unit volume thereof, means controlled by said calorimeter for automatically varying the ratio of said pressure drops, whereby the proportionality of said fluid flows is definitely varied in accordance with and to compensate for variations in the total heating value per unit volume of said mixture with respect to a predetermined value, said flow controlling valve being normally operable in either direction throughout a predetermined range upon a given setting of said restrictions jointly, and means coacting with said flow controlling valve to effect operation of said restrictions concurrently therewith upon a given degree of operation of said valve in either direction.

3. In a gas mixing control system, in combination, a pair of branch conduits through which gaseous fluids are respectively adapted to flow, said fluids being of different quality or total heating value per unit volume with respect to each other, a main conduit into which said branch conduits are adapted to discharge to provide for mixing of said fluids, an adjustable restriction in each of said branch conduits, a flow controlling valve in one of said branch conduits, means including a pair of diaphragms respectively operable automatically in response to variations in the values of the pressure drops across said restrictions, means controlled by said diaphragms jointly for effecting operation of said flow controlling valve whereby said pressure drops are normally maintained substantially proportional to each other under conditions of variation in the rates of flow of the fluids as an incident to variations in demand for the mixture thereof, means coacting with said flow controlling valve to provide for joint operation of said restrictions under given pressure conditions, means including a calorimeter for withdrawing from said main conduit and burning a continuous sample of the fluid mixture to ascertain the total heating value per unit volume thereof, and means controlled by said calorimeter for modifying the operation of said means responsive to variations in the values of said pressure drops, whereby the proportionality of said fluid flows is varied in accordance with and to compensate for variations in the total heating value per unit volume of said mixture with respect to a predetermined value.

4. In a gas mixing control system, in combination, a pair of branch conduits through which constituent gaseous fluids of different quality or total heating value per unit volume are respectively adapted to flow, a main conduit into which said branch conduits are adapted to discharge, an adjustable valve in each of said branch conduits, an additional valve located in one of said branch conduits, means including a pair of diaphragms respectively operable automatically in response to variations in the values of the pressure drops across said first mentioned valves with respect to predetermined values, means for subjecting said additional valve to control by said diaphragms jointly whereby the rates of flow of said constitutent fluids are maintained substantially proportional to each other under conditions of variation in demand for the mixture thereof, means including a calorimeter for withdrawing and burning a continuous sample of the mixture of combustible fluids to ascertain the total heating value per unit volume thereof, means controlled by said calorimeter and cooperating with said diaphragms for definitely varying the proportionality of said constituent combustible fluid flows in accordance with and to compensate for variations in the total heating value per unit volume of said mixture with respect to a predetermined value, and means coacting with said additional valve to effect corresponding operation of said first mentioned valves jointly therewith under given pressure conditions.

5. In a gas mixing control system, in combination, a pair of conduits through which gaseous fluids of different quality or total heating value per unit volume are respectively adapted to flow, a main conduit into which said branch conduits are adapted to discharge, an adjustable restriction in each of said branch conduits, said restrictions being initially adjusted to provide a predetermined ratio of the pressure drops thereacross, means including a pair of diaphragms respectively operable in response to variations in the value of said pressure drops, fluid pressure means subject to control by said diaphragms jointly, whereby said fluid pressure means is responsive to the differential value of said pressure drops, a flow controlling valve in one of said branch conduits, means for subjecting said valve to control by said fluid pressure means whereby the ratio of said pressure drops is normally maintained substantially constant, and means including a calorimeter for withdrawing from said main conduit and burning a continuous sample of the mixture whereby the total heating value per unit volume thereof may be ascertained, said fluid pressure means being additionally subjected to control by said calorimeter whereby the ratio of said pressure drops is varied in accordance with and to compensate for variations in said total heating value per unit volume of the mixture with respect to a predetermined value.

6. In a gas mixing control system, in combination, a pair of conduits through which gaseous fluids of different quality or total heating value per unit volume are respectively adapted to flow, a main conduit into which said branch conduits are adapted to discharge, an adjustable restriction in each of said branch conduits, said restrictions being initially adjusted to provide a predetermined ratio of the pressure drops thereacross, means including a pair of diaphragms respectively operable in response to variations in the value of said pressure drops, fluid pressure means subject to control by said diaphragms jointly, whereby said fluid pressure means is responsive to the differential value of said pressure drops, a flow controlling valve in one of said branch conduits, means for subjecting said valve to control by said fluid pressure means whereby the ratio of said pressure drops is normally maintained substantially constant, means including a calorimeter for withdrawing from said main conduit and burning a continuous sample of the mixture whereby the total heating value per unit volume thereof may be ascertained, said fluid pressure means being additionally subjected to control by said calorimeter whereby the ratio of said pressure drops is varied in accordance with and to compensate for variations in said total heating value per unit volume of the mixture with respect to a predetermined value, and means including a flow regulating valve located in advance of said flow controlling valve, with reference to the direction of fluid flow, said flow regulating valve being operable automatically in response to variations in the pressure drop across said flow controlling valve, whereby said pressure drop is maintained substantially constant.

7. In a gaseous fluid mixing control system, in combination, a pair of conduits through which gaseous fluids of different quality or total heating value per unit volume are respectively adapted to flow, a main conduit into which said branch conduits are adapted to discharge, an adjustable restriction in each of said branch conduits, said restrictions being initially adjusted to provide a predetermined ratio of the pressure drops thereacross, means for maintaining said ratio substantially constant, said means comprising a flow controlling valve located in one of said branch conduits in advance of the aforementioned restriction in the latter, fluid pressure means operable automatically to effect opening or closing movement of said valve, coacting means for subjecting said fluid pressure means to control in accordance with the differential value of the pressure drops across said restrictions, whereby said differential value is normally maintained substantially constant, means including levers and linkage to provide for like operation of said restrictions in unison, and additional linkage for mechanically connecting said restrictions with said flow controlling valve, said additional linkage including an adjustable lost motion connection whereby said flow controlling valve is normally operable throughout a predetermined range independently of said restrictions.

8. In a gaseous fluid mixing control system, in combination, a pair of conduits through which gaseous fluids of different quality or total heating value per unit volume are respectively adapted to flow, a main conduit into which said branch conduits are adapted to discharge, an adjustable restriction in each of said branch conduits, said restrictions being initially adjusted to provide a predetermined ratio of the pressure drops thereacross, means for maintaining said ratio substantially constant, said means comprising a flow controlling valve located in one of said branch conduits in advance of the aforementioned restriction in the latter, fluid pressure means operable automatically to effect opening or closing movement of said valve, coacting means for subjecting said fluid pressure means to control in accordance with the differential value of the pressure drops across said restrictions, whereby said differential value is normally maintained substantially constant, means including a precision calorimeter for withdrawing from said main conduit and burning a continuous sample of the fluid mixture and for ascertaining the instantaneous total heating value per unit volume thereof, means for additionally subjecting said fluid pressure means to control in accordance with the determinations of said calorimeter whereby said differential value is varied in accordance with and to compensate for variations in said total heating value with respect to a predetermined value, means including levers and linkage to provide for like operation of said restrictions in unison, and additional linkage for mechanically connecting said restrictions with said flow controlling valve, said additional linkage including an adjustable lost motion connection whereby said flow controlling valve is normally operable throughout a predetermined range independently of said restrictions.

9. In a gaseous fluid mixing control system, in combination, a pair of conduits through which gaseous fluids of different quality or total heating value per unit volume are respectively adapted to flow, a main conduit into which said branch conduits are adapted to discharge, an adjustable restriction in each of said branch conduits, said restrictions being initially adjusted to provide a predetermined ratio of the pressure drops thereacross, means for maintaining said ratio substantially constant, said means comprising a flow controlling valve located in one of said branch conduits in advance of the aforementioned restriction in the latter, means supplied with fluid pressure from a separate source and operable automatically to effect opening or closing movement of said valve, means for subjecting said fluid pressure means to control in accordance with the differential value of the pressure drops across said restrictions, whereby said differential value is normally maintained substantially constant, means including a precision calorimeter for withdrawing from said main conduit and burning a continuous sample of the fluid mixture and for ascertaining the instantaneous total heating value per unit volume thereof, means for additionally subjecting said fluid pressure means to control in accordance with the determinations of said calorimeter whereby said differential value is varied in accordance with and to compensate for variations in said total heating value with respect to a predetermined value, means including levers and linkage to provide for like operation of said restrictions in unison, additional linkage for mechanically connecting said restrictions with said flow controlling valve, said additional linkage including an adjustable lost motion connection whereby said flow controlling valve is normally operable throughout a predetermined range independently of said restrictions, and a pressure regulating valve located in advance of said flow controlling valve, said regulating valve including an operating diaphragm the lower surface of which is subjected to the pressure on the upstream side of said flow controlling valve and the upper surface of which is subjected to the pressure on the downstream side of said flow controlling valve, whereby the pressure drop across the latter is maintained substantially constant.

10. In a gaseous fluid mixing control system of the character described, in combination, a source of gaseous fluid of relatively high quality or total heating value per unit volume, another source of gaseous fluid, such as air, of relatively low quality or total heating value per unit volume, branch conduits through which said fluids are respectively adapted to flow and a main conduit into which said branch conduits are adapted to discharge to provide for mixture of said fluids, an adjustable restriction in each of said branch conduits, levers and linkage connected with said restrictions to provide for like operation thereof in unison, a flow controlling valve located in advance of one of said restrictions, means supplied with fluid pressure from a separate source and operable automatically for effecting opening or closing of said valve, means including diaphragms respectively operable automatically in response to variations in the differential value of the pressure drops across said restrictions, means for subjecting said fluid pressure means to control by said last mentioned means whereby the ratio of said pressure drops is normally maintained substantially constant, flow regulating means cooperating with said valve and operable automatically to maintain a substantially constant pressure drop thereacross, means including a calorimeter for continuously ascertaining the instantaneous quality or total heating value per unit volume of the fluid mixture, means for additionally subjecting said fluid pressure means to control in accordance with the determinations of said calorimeter whereby the aforementioned ratio of said pressure drops is definitely varied in accordance with and to compensate for variations in said total heating value of the fluid mixture, a plurality of power operated pumps adapted to withdraw the fluid mixture from said main conduit, said pumps being selectively operable automatically either individually or jointly in accordance with the demand for the fluid mixture, a storage container to which one of said pumps is adapted to supply the fluid mixture under relatively high pressure, and coacting means for insuring ascertainment by said calorimeter of the quality or total heating value per unit volume of said fluid mixture prior to passage thereof into said storage container.

11. In a gaseous fluid mixing control system of the character described, in combination, a source of gaseous fluid of relatively high quality or total heating value per unit volume, another source of gaseous fluid, such as air, of relatively low quality or total heating value per unit volume, branch conduits through which said fluids are respectively adapted to flow and a main conduit into which said branch conduits are adapted to discharge to provide for mixture of said fluids, an adjustable restriction in each of said branch conduits, levers and linkage connected with said restrictions to provide for like operation thereof in unison, a flow controlling valve located in advance of one of said restrictions, means supplied with fluid pressure from a separate source and operable automatically for effecting opening or closing of said valve, means including diaphragms respectively operable automatically in response to variations in the differential value of the pressure drops across said restrictions, means for subjecting said fluid pressure means to control by said last mentioned means whereby the ratio of said pressure drops is normally maintained substantially constant, flow regulating means coacting with said valve and operable automatically to maintain a substantially constant pressure drop thereacross, means including a calorimeter for continuously ascertaining the instantaneous quality or total heating value per unit volume of the fluid mixture, means for additionally subjecting said fluid pressure means to control in accordance with the determinations of said calorimeter whereby the aforementioned ratio of said pressure drops is definitely varied in acordance with and to compensate for variations in said total heating value of the fluid mixture, a plurality of power operated pumps adapted to withdraw the fluid mixture from said main conduit, said pumps being selectively operable automatically either individually or jointly in accordance with the demand for the fluid mixture, a storage container to which one of said pumps is adapted to supply the fluid mixture under relatively high pressure, means including a valve operable automatically for insuring ascertainment by said calorimeter of the quality or total heating value per unit volume of said fluid mixture prior to passage thereof into said storage container, and means operable in response to a predetermined reduction in pressure of fluid from said first mentioned source for producing an audible signal, said last mentioned means including a pressure responsive switch and a bell-ringing circuit controlled thereby.

12. In a gas mixing control system, in combination, a pair of branch conduits through which gaseous fluids of different quality or total heating value per unit volume are respectively adapted to flow, a main conduit into which said branch conduits are adapted to discharge to provide for mixture of said fluids, an adjustable restriction located in each of said branch conduits, power operated means including a reversible electric driving motor for effecting like operation of said restrictions in unison, control means for said motor including a reversing switch, means for controlling the operation of said switch, said means comprising a pressure responsive valve located in one of said branch conduits in advance of the aforementioned adjustable restriction located therein, said pressure responsive valve including a closed chamber within which a pair of flexible diaphragms are arranged in spaced relationship to each other, common means for subjecting the adjacent faces of said diaphragms to pressure conditions on the downstream side of each of said restrictions, the other faces of said diaphragms being subjected to the pressure conditions on the upstream sides of said restrictions respectively, means for adjustably loading said pressure responsive valve, and linkage between the same and said diaphragms jointly to provide for adjustment thereof automatically in accordance with and to compensate for variations in the differential value of the pressure drops across said restrictions, whereby said differential value is normally maintained substantially constant.

13. In a gas mixing control system, in combination, a pair of branch conduits through which gaseous fluids of different quality or total heating value per unit volume are respectively adapted to flow, a main conduit into which said branch conduits are adapted to discharge to provide for mixture of said fluids, an adjustable restriction located in each of said branch conduits, power operated means including a reversible electric driving motor for effecting like operation of said restrictions in unison, control means for said motor including a reversing switch, means for controlling the operation of said switch, said means comprising a pressure responsive valve located in one of said branch conduits in advance of the aforementioned adjustable restriction located therein, said pressure responsive valve including a closed chamber within which a pair of flexible diaphragms are arranged in spaced relationship to each other, common means for subjecting the adjacent faces of said diaphragms to pressure conditions on the downstream side of each of said restrictions, the other faces of said diaphragms being subjected to the pressure conditions on the upstream sides of said restrictions respectively, means for adjustably loading said pressure responsive valve, linkage between the same and said diaphragms jointly to provide for adjustment thereof automatically in accordance with and to compensate for variations in the differential value of the pressure drops across said restrictions, whereby said differential value is normally maintained substantially constant, and said pressure responsive valve being adapted upon a given adjustment thereof in either direction to effect corresponding closure of said reversing switch, whereby said restrictions are operated jointly by said motor in a direction and to a degree to effect restoration of a predetermined differential value of the pressure drops thereacross.

14. In a gas mixing control system, in combination, a pair of branch conduits through which gaseous fluids of different quality or total heating value per unit volume are respectively adapted to flow, a main conduit into which said branch conduits are adapted to discharge to provide for mixture of said fluids, an adjustable restriction located in each of said branch conduits, power operated means including a reversible electric driving motor for effecting like operation of said restrictions in unison, control means for said motor including a reversing switch, means for controlling the operation of said switch, said means comprising a pressure responsive valve located in one of said branch conduits in advance of the aforementioned adjustable restriction located therein, said pressure responsive valve including a closed chamber within which a pair of flexible diaphragms are arranged in spaced relationship to each other, common means for subjecting the adjacent faces of said diaphragms to pressure conditions on the downstream side of each of said restrictions, the other faces of said diaphragms being subjected to the pressure conditions on the upstream sides of said restrictions respectively, means for adjustably loading said pressure responsive valve, linkage between the same and said diaphragms jointly to provide for adjustment thereof automatically in accordance with and to compensate for variations in the differential value of the pressure drops across said restrictions, whereby said differential value is normally maintained substantially constant, said pressure responsive valve being adapted upon a given adjustment thereof in either direction to effect corresponding closure of said reversing switch, whereby said restrictions are operated jointly by said motor in a direction and to a degree to effect restoration of a predetermined differential value of the pressure drops thereacross, and means for varying the differential value of said pressure drops in accordance with and to compensate for variations in the total heating value per unit volume of the fluid mixture, said means including a calorimeter adapted to withdraw and burn a continuous sample of said mixture.

15. In a gas mixing control system, in combination, a pair of branch conduits through which gaseous fluids of different quality or total heating value per unit volume are respectively adapted to flow, a main conduit into which said branch conduits are adapted to discharge to provide for mixture of said fluids, an adjustable restriction located in each of said branch conduits, power operated means including a reversible electric driving motor for effecting like operation of said restrictions in unison, control means for said motor including a reversing switch, means for controlling the operation of said switch, said means comprising a pressure responsive valve located in one of said branch conduits in advance of the aforementioned adjustable restriction associated therewith, said pressure responsive valve including a closed chamber within which a pair of flexible diaphragms are arranged in spaced relationship to each other, common means for subjecting the adjacent faces of said diaphragms to pressure conditions on the downstream side of each of said restrictions, the other faces of said diaphragms being subjected to the pressure conditions on the upstream sides of said restrictions respectively, means for adjustably loading said pressure responsive valve, linkage between the same and said diaphragms jointly to provide for adjustment thereof automatically in accordance with and to compensate for variations in the differential value of the pressure drops across said restrictions, whereby said differential value is normally maintained substantially constant, said pressure responsive valve being adapted upon a given adjustment thereof in either direction to effect corresponding closure of said reversing switch, whereby said restrictions are operated jointly by said motor in a direction and to a degree to effect restoration of a predetermined differential value of the pressure drops thereacross, means for varying the differential value of said pressure drops in accordance with and to compensate for variations in the total heating value per unit volume of the fluid mixture, said means including a calorimeter adapted to withdraw and burn a continuous sample of said mixture, and means controlled by said calorimeter for automatically varying the pressure conditions on said other face of one of said diaphragms.

16. In a gas mixing control system, in combination, a pair of branch conduits through which gaseous fluids of different quality or total heating value per unit volume are respectively adapted to flow, a main conduit into which said branch conduits are adapted to discharge to provide for mixture of said fluids, an adjustable restriction located in each of said branch conduits, power operated means including a reversible electric driving motor for effecting like operation of said restrictions in unison, control means for said motor including a reversing switch, means for controlling the operation of said switch, said means comprising a pressure responsive valve located in one of said branch conduits in advance of the aforementioned adjustable restriction associated therewith, said pressure responsive valve including a closed chamber within which a pair of flexible diaphragms are arranged in spaced relationship to each other, common means for subjecting the adjacent faces of said diaphragms to pressure conditions on the downstream side of each of said restrictions, the other faces of said diaphragms being subjected to the pressure conditions on the upstream sides of said restrictions respectively, means for adjustably loading said presure responsive valve, linkage between the same and said diaphragms jointly to provide for adjustment thereof automatically in accordance with and to compensate for variations in the differential value of the pressure drops across said restrictions, whereby said differential value is normally maintained substantially constant, said pressure responsive valve being adapted upon a given adjustment thereof in either direction to effect corresponding closure of said reversing switch, whereby said restrictions are operated jointly by said motor in a direction and to a degree to effect restoration of a predetermined differential value of the pressure drops thereacross, means for varying the differential value of said pressure drops in accordance with and to compensate for variations in the total heating value per unit volume of the fluid mixture, said means including a calorimeter adapted to withdraw and burn a continuous sample of said mixture, and means controlled by said calorimeter for automatically varying the pressure conditions on said other face of one of said diaphragms, said last mentioned means including a reversible electric motor and means controlled thereby for effecting operation of one of said restrictions independently of the other of the same.

17. In a gas mixing control system, in combination, a plurality of branch conduits through which gaseous fluids of different quality or total heating value per unit volume are respectively adapted to flow, a main conduit into which said branch conduits are adapted to discharge to provide for mixture of said fluids, means for proportioning said fluid flows to insure a substantially constant predetermined total heating value per unit volume of the mixture under conditions of variations in the rate of demand therefor, a plurality of power-operated compressors, said compressors respectively having different capacities and one or more of the same being operable automatically in response to variations in the rate of demand for the mixture, at least one of said compressors being adapted to supply the mixture at relatively low pressure and another of said compressors being adapted to supply the mixture at a relatively high pressure, a distributing conduit into which said first mentioned compressor is adapted to directly discharge, said last mentioned compressor being adapted to initially discharge into a high-pressure holder of relatively large capacity, and means for discharging the mixture from said holder into said distributing conduit at a relatively low pressure under given conditions, whereby the maximum rate of supply of the mixture by the system is at least equal to the combined capacities of all of said compressors.

EDWIN X. SCHMIDT.
MILTON R. BRICE.

Certificate of Correction

Patent No. 1,999,740. April 30, 1935.

EDWIN X. SCHMIDT ET AL.

It is hereby certified that error appears in the printed specification of the above numbered patent requiring correction as follows: Page 3, second column, line 36, for "41°" read *41°*; page 4, first column, line 27, for "an" read *and*; same page, second column, line 8, after the syllable "rimeter" insert the words *supervision until the calorimeter*; and that the said Letters Patent should be read with these corrections therein that the same may conform to the record of the case in the Patent Office.

Signed and sealed this 9th day of July, A. D. 1935.

[SEAL]

BRYAN M. BATTEY,
*Acting Commissioner of Patents.*